United States Patent Office 3,354,095
Patented Nov. 21, 1967

3,354,095
SOLID, SUBSTANTIALLY SPHERICAL, HARD
PARTICLES AND PREPARATION THEREOF
Alfred J. Burzynski and Robert E. Martin, Toledo, Ohio, assignors to Owens-Illinois, Inc., a corporation of Ohio
No Drawing. Filed July 23, 1964, Ser. No. 384,766
13 Claims. (Cl. 252—316)

This application is a continuation-in-part of our copending application Ser. No. 127,478, filed July 28, 1961, assigned to the same assignee as the present invention and now abandoned.

In our copending application Ser. No. 267,785, filed Mar. 25, 1963, as a continuation-in-part of the aforementioned application Ser. No. 127,478 that is parent to the instant application, said application Ser. No. 267,785 now being Patent No. 3,257,330 dated June 21, 1966, claims (separate and distinct from those of this application) are made to a method for forming colored, substantially spherical gel particles by a modification of the method claimed herein, namely, the addition of an organic dye to the system at a particular stage in the particle-forming process.

This invention relates to three-dimensional alkyl- or alkenylpolysiloxane gels in solid, substantially spherical or bead form. In another aspect, the invention relates to a method of forming solid three-dimensional alkyl- or alkenylpolysiloxanes in solid bead form from alkyl- or alkenyltrialkoxysilanes.

It is known to hydrolyze and condense alkyltrialkoxysilanes to form solid three-dimensional gels. However, the large irregular masses of gel must be mechanically broken up to form particles. Such particles, moreover, are irregular and jagged in shape and are subject to greater mechanical attrition in use and handling than are gels in substantially spherical or bead form.

It is thus an object of the invention to provide three-dimensional alkyl- or alkenylpolysiloxane gels in solid, substantially spherical or bead form. A further object is to provide a method for making particulate solid three-dimensional alkyl- or alkenylpolysiloxanes.

The method of the invention for producing the three-dimensional or cross-linked polymers in particulate form avoids any physical comminution of larger solid masses of such polymers. The method is unique in being an emulsion condensation in which the continuous phase is aqueous.

The starting material for the present process is an alkyl- or an alkenyltrialkoxysilane represented by the general formula

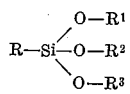

wherein R represents a radical selected from the group consisting of alkyl radicals having from 1 to 4 carbon atoms, inclusive, and alkenyl radicals containing from 2 to 4 carbon atoms, inclusive, and $R^1$, $R^2$ and $R^3$ each represent a lower alkyl radical, which may be the same or different, e.g., methyl, ethyl and propyl through hexyl (both normal and isomeric forms). The radicals represented by R include methyl, ethyl and the normal and isomeric forms of propyl and butyl; and such alkenyl radicals as, for example, vinyl, allyl, α-methallyl (2-butenyl or crotyl), propenyl, isopropenyl, 1-butenyl and 3-butenyl.

Illustrative examples of alkoxysilanes embraced by Formula I are the $C_1$ through $C_4$-alkyl- and the $C_2$ through $C_4$-alkenyltrimethoxy- through trihexoxysilanes wherein the alkoxy substituents are symmetrical; and the $C_1$ through $C_4$-alkyl- and the $C_2$ through $C_4$-alkenyltrimethoxy- through trihexoxysilanes wherein the alkoxy substituents are unsymmetrical, i.e., at least one is different from the others.

More specific examples of alkoxysilanes within the scope of Formula I are methyltrimethoxysilane,
methyltriethoxysilane,
ethyltrimethoxysilane,
n-propyltripropoxysilane,
n-butyltributoxysilane,
isobutyltripentoxysilane,
methyltrihexoxysilane,
n-butyltrimethoxysilane,
vinyltrimethoxysilane,
allyltrimethoxysilane,
vinyltriethoxysilane,
methyl(methoxydihexoxy)silane,
ethyl(ethoxydimethoxy)silane,
n-propyl(methoxydipropoxy)silane,
isobutyl(ethoxydiisobutoxy)silane,
ethyl(methoxydiethoxy)silane and
vinyl(ethoxydimethoxy)silane.

Other specific examples will be apparent to those skilled in the art from the foregoing illustrative examples, from Formula I and from the examples of radicals represented by R, $R^1$, $R^2$ and $R^3$ in Formula I.

The present invention provides a method which comprises mixing an alkyl- or alkenyltrialkoxysilane embraced by Formula I with an aqueous medium having a neutral pH (that is, a pH of about 7.0) or an acid pH (that is, a pH below 7.0) while agitating the mixture until the two-phase system initially formed substantially clears upon hydrolysis of alkoxy groups. Thereafter agitation is continued in the presence of an emulsifying agent until the aqueous reaction mass clouds and water-immiscible liquid droplets form, followed by hardening of said droplets into substantially spherical solid gel particles.

Thus, in the applicants' technique of hydrolyzing and condensing to a gel an alkoxysilane embraced by Formula I, substantially spherical solid gel particles are obtained by effecting hydrolysis in an aqueous medium having a pH of 7 or lower, with agitation, until alkoxy groups of the alkoxysilane are hydrolyzed (forming an alkanol), and providing an emulsifying agent dispersed in the said aqueous medium before the said medium clouds and immiscible liquid droplets separate therefrom. Agitation is continued until the aforesaid immiscible droplets form and subsequently harden to substantially spherical gel particles.

The essential conditions of the process of the instant invention are (1) that alkoxysilanes of the kind embraced by Formula I be employed; (2) that the initial hydrolysis step be carried out in an aqueous medium at a pH no higher than 7 (substantially 7); (3) that some agitation be employed; and (4) that an emulsifier (surface-active agent or surfactant) be present when the immiscible liquid droplets form and harden to solids. As will be appreciated by those skilled in the art, additional modifications or variations may be employed to shorten or otherwise to improve the process as desired or as conditions may require. The need or desirability for such changes may depend, at least to some extent, upon the particular starting material employed.

For instance, ordinary room temperature and a neutral pH are satisfactory in the case of methyltrimethoxysilane, since it is the most easily hydrolyzed monomer. Ethyltrimethoxysilane also forms beads without much difficulty under these conditions. However, in all cases the step of hydrolysis is accelerated by increasing the temperature or by using an acid pH. For instance, hydrolysis of the ethyltriethoxysilane at room temperature takes an inordinately long time, especially if the pH is only slightly acid (e.g., pH 6-7). Thus, most of the alkoxysilane starting materials are most conveniently hydrolyzed using a pH of below 6, usually about 2-5, and a temperature above about 30° C. Also, in the condensing step (i.e., the droplet- and bead-forming step), it is usually preferable to make the mixture slightly basic, up to a pH of about 10, usually over 7 but below 9. It is also preferable to heat in most cases the mixture mildly, for instance to 40°-90° C., during this stage. A higher pH may be used but care must be taken that the pH is not so high that immiscible droplets do not form. This condition occurs at pH values of about 11 or somewhat higher.

Although the emulsifier is not necessary in the first or hydrolysis step and needs only to be present by the time that the immiscible liquid droplets form, it is convenient and usually advantageous to add the emulsifier to the initial mixture of water and trialkoxysilane.

The course of the reaction is visually quite striking. In a typical case, the alkoxysilane is mixed with water acidified to a pH of about 4 and containing an emulsifier. At first a cloudy emulsion results with stirring but, as hydrolysis proceeds, a substantially clear one-phase system develops. Then the mixture is made basic, and shortly thereafter there is a sudden "flash" to a very cloudy emulsion of liquid droplets. Continued agitation of the emulsion, usually with the aid of mild heating to 50°-90° C., hardens the droplets to solid beads.

In a typical procedure, the substantially clear solution or dispersion formed in the hydrolysis step is effected with the aid of heating, usually at temperatures within the range of from 35°-60° C. The step of neutralizing the acid in the aqueous solution and adjusting the pH to the basic side can be carried out at the temperature of the acid solution when it has become clear. It has been found, however, that best results in carrying out this step are usually obtained when the mixture has been cooled to about 35°-40° C. or below, and the mixture is then reheated to form the bead polymers. The final temperature in the bead-formation step typically is from 50°-90° C., most often from 60°-80° C. In any case, the temperature can be slowly elevated until droplet formation takes place. The preferred temperatures will vary with, for example, the particular starting material employed and the pH of the reaction mass. These temperatures are easily determined in any given case by routine testing.

The particle size of the beads obtained is affected by the variables of the process. Major factors include water content, amount of emulsifier and agitation. Increasing any of these influencing factors usually decreases particle size. Usual particle sizes are from about 1 micron to about 1.5 mm. diameter.

The amount of water used is in excess of 3 moles per mole of the trialkoxysilane. As a practical matter, the amount of water employed is generally at least equal in volume to that of the alkyl- or alkenyltrialkoxysilane.

The amount of emulsifier (surface-active agent) used varies with the particular agent and the particular alkyl- or alkenyltrialkoxysilane, the amount of water, and other influencing factors, and is best determined empirically in any given case by routine test. Of course, enough emulsifier should be employed to cause the formation of the spherical oily droplets and to protect the droplets during hardening so that they do not agglomerate to form irregular gel particles. The emulsifying agent employed is, of course, a water-dispersible type, but otherwise it can be any one of the three known types: non-ionic, anionic, or cationic. Of course, if a fatty-acid soap or other acid-insoluble soap is contemplated, its use is precluded when the beads are formed on the acid side.

In addition to the water-soluble soaps, other types of organic compound non-ionic, anionic and cationic emulsifiers can be mentioned: alkyl sulfates, such as sodium lauryl sulfate and sodium cetane sulfate; alkyl and alkaryl sulfonates, such as sodium alkyl naphthalene sulfonate, potassium dodecylbenzene sulfonate, sodium isopropylnaphthalene sulfonate, dibutylphenylphenol sodium disulfonate, di(2-ethylhexyl) ester of sodium sulfosuccinic acid; polyethylene glycol lauryl ether, diethylene glycol monostearate, sodium oleyl sulfate, compounds represented by the formula

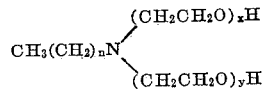

and which are commercially available under the name of Ethomeens; the condensation products of an alkylene oxide with alcohols, mercaptans, phenols or organic acids, such as the polyethylene glycol ester of abietic acid, polyethylene glycol stearate, condensation product of ethylene glycol with butylphenol or with diisobutylphenol, condensation product of n-dodecylmercaptan with ethylene oxide, the surfactants available under the name of the Spans, such as sorbitan monopalmitate and sorbitan monooleate, and under the name of Tweens, such as tris(polyoxyethylene) sorbitan; the surfactants available under the name of Pluronics, which are block polymers of polypropylene glycol chains and polyethylene glycol chains with a molecular weight of at least about 2000, with about equal portions of the molecular weight in the polypropylene glycol and polyethylene glycol portions; polyethylene glycol stearate, sodium N-methyl-N-oleyltaurate, sodium oleylisethionate, sodium salt of sulfonated monoglyceride of coconut fatty acids, sodium salt of sulfonated heptadecylbenzimidazole, cetyldimethylethylammonium bromide, cetyldimethylbenzylammonium chloride, $$[CH_3(CH_2)_{10}CH_2N^+(CH_3)_2CH_2C_6H_4]Cl$$

and the nonylphenyl ether of polyethylene glycol (condensation product of nonylphenol with, for example, 8 to 24 or more moles of ethylene oxide).

In the acidification step of the invention, when used, either organic carboxylic acids or mineral acids can be employed. Sulfuric acid and hydrochloric acid are very satisfactory, while acetic acid is a representative useful organic acid.

In the step of raising the pH above 7, when used, organic or inorganic bases can be employed such as alkali-metal or ammonium hydroxides including, for example, LiOH, NaOH and KOH; the alkaline-earth metal hydroxides, for instance, barium hydroxide, calcium hydroxide, etc.; the various amines, e.g., triethylamine, pyridine, diethanolamine, etc.

The new products of the invention produced as above described are solid gel, three-dimensional alkyl- or alkenylsiloxane condensation polymers in substantially spherical particulate form which, when dried, comprise units $(R—SiO)_{1.5}$ when the starting monomer consists entirely or essentially of one or more of the alkyl- or alkenyltrialkoxysilanes embraced by Formula I. Thus, the products are solid gel polysiloxanes in substantially spherical form and contain substantially one R group, as before defined, per silicon atom directly bonded to each silicon atom.

The reaction involved in the preparation of the beads hereinbefore described may be illustrated by the following equations where R has the same meaning as given in Formula I and Et represents an ethyl radical, which is one of the radicals embraced by $R^1$, $R^2$ and $R^3$ in Formula I. In Equation III, which is merely illustrative of the polymerization reaction, n is a positive integer more than 1, and represents the degree of polymerization. Thus n may be, for example, from 2 to 1,000,000 or more.

II

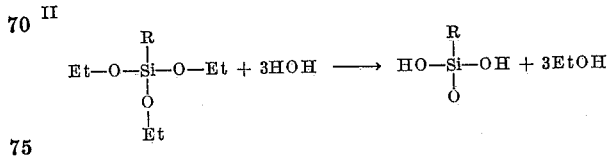

III

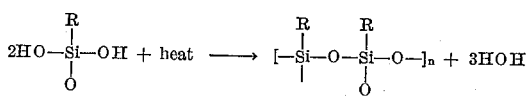

The beads can be heated to 250° C. without any appreciable decomposition. The bead size, clarity and hardness can be controlled by such influencing factors as, for example, the rate of agitation, and the particular temperature, base and emulsifier used.

If the beads are heated slowly with a free access of an oxidizing gas, e.g., air or oxygen, to a temperature of the order of 400°–450° C. and higher, darkening or blackening first occurs, and beads of pure silica are thereafter formed as the organic component is decomposed to oxides of carbon and organic oxidation products. This heat-treating or ignition step is illustrated in Example XIII where it is pointed out that some of the beads of that example turned gray at 300° C. and darker yet at 420° C.

Heat-treating temperatures above 450° C. in an oxidizing atmosphere, e.g., air, can be used to expedite the decomposition of the organic radical, e.g., from about 500° to 1000° or 1200° C. This high-temperature heat-treating step, which causes decomposition of the organic radical in the solid, substantially spherical gel particles, may be illustrated by the following equation (Equation IV) in which the —C₂H₅ radical has been substituted for R in the silicon-containing product of Equation III:

IV

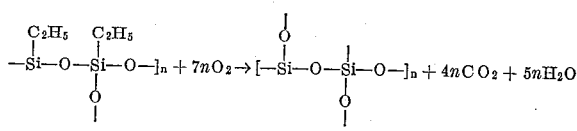

X-ray diffraction patterns of the beads after being heated to 1000° C. indicate that they are amorphous silica. Surprisingly and unobviously they are very porous and, therefore, have an extremely large total (including internal) surface area. In view of their porosity and other outstanding physical properties such as hardness or abrasion-resistance, the heat-treated beads substantially freed of chemically-bound organic component and any other organic material that may have been initially present are particularly adapted for use in the art of catalysis. Thus, they may be employed as a support for such catalysts as, for example, platinum and vanadium catalysts, Ziegler-Natta-type catalysts, and other conventional active catalysts used in the petroleum-refining and petrochemical arts.

When the beads are heated at about 1000° C. there is almost no indication whatsoever of sintering, and the beads remain separate from one another. However, if they are tray-heated substantially above 1200° C., for example at about 1400° or 1500° C., some sintering occurs. Such sintering at temperatures of 1400°–1500° C. and above may be avoided by using special heat-treating techniques such as flash or spray heat-treating methods wherein the beads are subjected to the normal sintering temperature only momentarily.

In general, when the above-described "after" heat-treatment (or ignition treatment) is applied to the substantially spherical solid gel particles, such heat-treatment is carried out at a temperature within the range of from about 400° C. to about 1500° C. for a period sufficient to remove chemically-bound organic groups (also any organic residue) from, but insufficient to cause substantial sintering together of, the individual particles. Of course, the use of lower or higher temperatures is not precluded so long as substantially the same results are obtained.

Especially when the beads are to be used as catalysts and in other applications where a small amount (e.g., a few parts per million of metallic ions might be objectionable), the possibilty of any such ions being present can be minimized by soaking the initial, substantially spherical, solid gel particles, after having been isolated and dried, in a dilute aqueous solution of a base, more particularly a water-soluble nitrogen-containing base such as an aqueous ammonium hydroxide solution, which at N concentration has a pH of about 11.6. Preferably an NH₄OH solution adjusted to a pH below about 10.0, more particularly a pH between about 8 and 9, is employed. Advantageously the beads are soaked in the solution of the base at room temperature (20°–30° C.) for a period sufficient to remove any metallic ions in the beads, e.g., from 6 or 8 to 24 or 48 hours or longer, as desired or as conditions may require. Temperatures above or below ambient temperature may be employed when it is beneficial or advantageous to do so; for example, the soaking temperature may range from 5° or 10° C. to 40° or 50° C. Ordinarily no particular advantages accrue from using temperatures other than ambient temperatures.

Instead of using ammonium hydroxide as the base, other bases may be used such as, for instance, soluble (preferably water-soluble) organic amines. Illustrative examples of organic amines that may be employed are the aliphatic (including cycloaliphatic), more particularly alkyl, amines boiling above about 20° C., e.g., di- and triethylamine, and the mono-, di- and tripropyl- through -hexylamines (both normal and isomeric forms), mono-, di- and tricyclopentyl- and -cyclohexylamines, etc.; unsymmetrical amines, e.g., N-ethylpropylamine, N-methylbutylamine, etc.; alkylene polyamines, e.g., ethylenediamine, diethylenetriamine, triethylenetetramine, etc; the mono-, di- and trialkanolamines, e.g., mono-, di- and triethanol-, tripropanol-, triisopropanol- and tributanolamines, etc.; aromatic amines, e.g., aniline, N-methylaniline, etc.; and others that are in the literature, e.g., Handbook of Chemistry and Physics, 44th edition, 1962-1963, Chemical Rubber Publishing Company, Cleveland, Ohio, and U.S. Patent No. 2,582,594, column 14. In some cases it may be desirable to use stronger nitrogen bases such as the various quaternary ammonium compounds.

The following examples are merely illustrative of the invention but should not be considered as limiting thereof.

*Example I*

A mixture of 75 ml. of water, 40 ml. of vinyltriethoxysilane and 5 gms. of the nonylphenyl ether of polyethylene glycol (Tergitol NPX), having a specific gravity of 1.063 (20/20° C.), was made up and the pH was adjusted to about 2 by adding dilute HCl. The mixture was slowly heated, with stirring, until it substantially cleared at 50° C. and was then cooled down to room temperature. The solution clouded and was stirred for about 16 hours at room temperature (20°–30° C.). Then dilute NaOH was added until the pH was nearly neutral (pH about 8). Immiscible liquid droplets formed and hardened into substantially spherical beads at room temperature within 10 minutes after addition of the base.

*Example II*

A mixture of 75 ml. of water, 4.8 gms. of the emulsifier of Example I, 43 ml. of ethyltriethoxysilane, and enough dilute H₂SO₄ to bring the mixture to a pH of about 3–4 was added to a stirred reaction vessel at room temperature. A cloudy emulsion was at first formed, and the reaction mixture was slowly heated to 65° C. and the solution became clear. It was then cooled to 37° C., and 80 drops of 1-normal potassium hydroxide were added, enough to make the mixture slightly basic. After a few minutes of stirring, the solution became cloudy. Heat was then applied over a period of 18 minutes to raise the temperature to 65° C. Oily droplets formed; and, on further heating, solid spherical gel beads were formed. These beads were about 1 mm. in diameter.

Example III

Example II was repeated except concentrated ammonium hydroxide solution was employed instead of KOH. Again, oily droplets were formed at the temperature of adding the base and these hardened to solid beads on heating to 70° C. These beads were about ½ mm. in diameter.

Example IV

Example II was repeated except that the emulsifier used in that example was replaced by 5 gms. of 28% aqueous solution of a sodium alkaryl polyether sulfonate (Triton X–200), and sodium hydroxide instead of potassium hydroxide was used as the base. Again, the results were the same. The beads were about ½ mm. in diameter.

Example V

To 75 ml. of water and 4.8 gms. of emulsifier (a nonylphenyl polyethylene glycol resulting from condensation of 1 mole of nonylphenol with about 20 moles of ethylene oxide) in a stirred reaction vessel was added 43 ml. of ethyltriethoxysilane. A cloudy opaque dispersion resulted. Dilute sulfuric acid was added until a pH of about 3–4 was obtained. This solution was heated to 65° C. whereupon it became clear. The solution was then cooled to 37° C. A small amount of concentrated ammonium hydroxide solution was added with continued stirring to make the solution slightly basic. After about 4 minutes, the solution suddenly became white and opaque. It was heated to 55° C., the heat removed and the mixture allowed to cool while continuing to stir. Oily droplets began to form, whereupon more base was added to obtain a pH of about 9. After a time the beads were hard, and more water was added and the solution filtered. The beads were washed with acetone, next with water, and given a final wash with C.P. acetone and dried. The particle size of the beads was about ½ mm. in diameter.

Example VI

Example V was repeated except that the emulsifier was a nonylphenyl polyethylene glycol resulting from condensation of 1 mole of nonylphenol with about 10 moles of ethylene oxide. The results were the same. Analysis showed that the beads contained substantially no ammonium ion.

Example VII

Ten (10) gms. of emulsifier (a nonylphenyl polyethylene glycol resulting from condensation of 1 mole of nonylphenol with about 20 moles of ethylene oxide) was dissolved with stirring in 75 ml. of distilled water, and with continued stirring 43 ml. of ethyltriethoxysilane were added. After stirring for several minutes, 10 drops of dilute HCl were added, making the solution just barely acidic. The mixture was cloudy white, and was heated to 60° C. until a completely clear solution was formed. It was then cooled to 35° C. and 1 N barium hydroxide solution was added until a pH of about 8 was obtained. The solution remained clear for about 5 minutes and then turned cloudy white in appearance. Stirring was continued with small additions of barium hydroxide solution. Oily droplets that tended to stick together appeared. Hence further emulsifier was added while stirring was continued. The barium hydroxide was added until the pH of the solution was about 9. The resulting mixture was heated to about 55° C. while the droplets hardened with continued stirring. Thereafter the reaction mass was allowed to cool with continued stirring. A large yield of very small spherical beads was obtained. The average diameter was about 100 microns.

Example VIII

Example VII was repeated except that the emulsifier was that used in Example I. The same results were obtained except that the beads formed were a little larger and were clearer. The particle size was about 100 microns.

Example IX

Four and eight-tenths (4.8) gms. of the emulsifier of Example I was dissolved with stirring in 75 ml. of distilled water and, while still stirring, 43 ml. of ethyltriethoxysilane was added to form a cloudy dispersion. Eight (8) drops of dilute sulfuric acid were added, bringing the solution to a pH of about 3–4. With continued stirring, the solution was heated to 60° C. and became clear. It was then cooled to about 35° C., at which time 35 drops of 1-molar lithium hydroxide were added until just basic. With continued stirring, after about 3–4 minutes the solution became cloudy white, and while stirring heat was applied until the temperature reached 60° C. at which time oily droplets formed. Then 20 more drops of 1-molar lithium hydroxide were added to bring the solution to a pH of about 9–10. The temperature was gradually raised with continued stirring to 58° C., and the beads had then hardened. The size of the beads was about ½ mm. in diameter. After filtration and drying, about 14.7 gms. of product beads was recovered. Infrared analysis showed Si—O—Si bonds and no detectable SiOH groups.

Example X

The procedure of Example IX was repeated except that triethylamine was employed instead of the lithium hydroxide solution and the final temperature was 55° C. The beads were washed with water and then washed with acetone and dried in an oven at 110° C. for 24 hours. About 13.6 gms. of dried beads of about 100 microns diameter was recovered.

Example XI

In a 500-ml. three-necked flask, equipped with a mechanical stirrer, reflux condenser, thermometer and heating mantle, were placed 300 ml. of water and 10 gms. of the emulsifier of Example I, and sufficient dilute sulfuric acid to adjust the pH to 3. Then 80 ml. of ethyltriethoxysilane was added to the flask, with stirring, and the milky dispersion was heated until it cleared at 65° C. The solution was then cooled to 35° C., and 1-molar sodium hydroxide solution was added to adjust the pH to 8. After a few minutes with continued stirring, clouding was observed and more sodium hydroxide was added to adjust the pH to about 10. The mixture was then heated to reflux at 86° C. and the vapors were condensed and allowed to flow back into the reaction vessel. After about 15 or 20 minutes, the small oily spherical droplets had hardened to solid spherical beads. The product was filtered, washed with water and acetone, and dried in an oven at 110° C. for 24 hours. The size of the beads was about 1 mm. in diameter.

Example XII

To 75 ml. water was added 40 ml. of vinyltriethoxysilane in a stirred vessel. The pH was adjusted to about 2–3 by adding dilute HCl. The mixture was slowly heated, over a period of 10–15 minutes to 60° C., at which time it substantially cleared. Then 5 gms. of the non-ionic emulsifier of Example I was added. Thereafter the pH was adjusted to about 8 with dilute NaOH. In about 2 minutes the mixture suddenly clouded, and it was found that immiscible liquid droplets had formed. With continued heating at about 55–60° C. for about 10 minutes these droplets hardened to cross-linked vinylpolysiloxane beads of substantially spherical shape and about 200 microns in diameter. They were washed and dried.

Example XIII

Five (5) gms. of the emulsifier of Example I was dissolved in 75 ml. of water, with stirring, and 40 ml. of methyltriethoxysilane was added to form a milky emulsion. Enough 1-normal HCl was added to just make the pH about 2–3. The mixture was heated with continued stirring to 60° C., and the solution cleared. It was cooled to 40° C. and 1-normal sodium hydroxide added to bring the solution just on the basic side. The solution was then gently heated and turned white after several minutes. Continued heating and turning stirring caused the formation of oily droplets and eventual hardening of the beads. The beads were washed with water and acetone, and dried. The infrared spectrum showed strong Si—O and Si—C bands, but no evidence of ethoxy groups. The dried beads appeared to soften slightly at 200° C. Some of the beads turned gray at 300° C. and turned darker yet at 420° C. Some of the beads remained white at 420° C. The decomposition that took place was probably decomposition of a small amount of residual emulsifier. The methylpolysiloxane gel beads were about 200 microns in diameter.

The foregoing was repeated in several runs using respectively, 0.5, 1, 2, and 3 gms. of the same emulsifier. With 2 and 3 gms., substantially the same results were obtained as with 5 gms. However, with the 1 and 0.5 gm. runs only a portion of the product was substantially spherical shaped (the remainder being small irregular particles) with a lower proportion of spheres in the product of the run wherein 0.5 gm. emulsifier was used. These runs are illustrative of the importance of the use of an emulsifier and the amount thereof. When the emulsifier is omitted altogether, the gel is formed either in one mass or a few large irregular masses, with no beads and substantially no small particles of any shape.

*Example XIV*

To 75 ml. of water was added 5 gms. of the emulsifier of Example I with stirring. Thereafter 40 ml. of methyltrimethoxysilane was added with stirring. The temperature rose without added heat to 52° C., and the solution cleared. It was very slightly acidic and enough 1 N sodium hydroxide was added to bring it very slightly on the basic side. After several seconds, oily droplets began to form and these condensed and hardened to beads in a short time. The beads were washed, filtered and rinsed several times, after which they were given a final washing with acetone and were then dried. The size of the beads was about ½ mm. in diameter.

*Example XV*

To 75 ml. water was added 40 ml. of vinyltriethoxysilane in a stirred reaction vessel. The pH was adjusted to about 2–3 by the addition of dilute HCl. The mixture was slowly heated over a period of 15 to 20 minutes to 60° C., at which time the mixture cleared to an apparently one-phase solution, due to the hydrolysis of ethoxy groups to hydroxyl groups and ethanol. The mixture was cooled to 30° C., and dilute NaOH added to make it just basic. Then, before any clouding occurred, 1.4 gms. of sodium stearate was added. After heating to about 45° C., immiscible liquid droplets separated, and these hardened to spherical particles about 1 mm. in diameter after heating at about 60° C. for about 10 minutes.

*Example XVI*

To 75 ml. of water was added 1.25 gms. of a cationic emulsifier, more particularly a quaternary ammonium compound and specifically cetyldimethylbenzylammonium chloride. Forty (40) ml. of ethyltriethoxysilane was added with stirring, and enough dilute HCl was introduced to make the pH about 2. The mixture was heated with stirring to about 55° C. where it cleared. It was then cooled to about 30° C., and 1 N NaOH was added until the pH of the mixture was about 8. The mixture clouded in a short time with continued stirring. After heating slowly to 60° C., the initially-formed oily droplets hardened to solid substantially spherical gel particles of ethylpolysiloxane. The reaction mixture was cooled, filtered and the isolated beads washed repeatedly with water to remove emulsifier and salts. They were next washed thoroughly with acetone, refiltered and dried.

The beads produced as above described were heated to 420° C. with only slight yellowing, probably from decomposition traces of emulsifier. The beads averaged about 200–300 microns in diameter.

*Example XVII*

This run demonstrates the effect of increased agitation on the size of the beads. The particle size obtained in the examples described hereinbefore ranged from about 100 microns to about 1 mm. and agitation was with a magnetic Teflon-covered stirring rod (measuring about 1.5″ x ¼″ x ¼″) in the bottom, being rotated at a maximum rate of about 200 r.p.m. and usually less. In the present example, the reaction vessel was a fluted 2-liter flask equipped with a driven Teflon propeller blade, capable of 1600 r.p.m. In this example the propeller was driven at about 400 r.p.m.

In this example, to 300 ml. of water in the resin kettle, containing 10 gms. of the emulsifier of Example I, was added 80 ml. of vinyltriethoxysilane. The mixture was acidified with dilute HCl to a pH of about 2–3. Stirring was started, and the contents of the kettle heated to about 50° C. where it formed a substantially clear solution. The contents of the kettle was allowed to cool to about 30° C., and then 1 N NaOH was added to bring the pH barely on the basic side. Heat was again supplied with continued vigorous stirring. At about 50° C. the mixture suddenly clouded upon separation of immiscible liquid, although the droplets were too small to be distinguished. After continued stirring to harden the droplets to solids, the mixture was cooled to room temperature and filtered. The solid filter cake was washed several times with water and finally with acetone and air dried. The resulting beads were found by examination in the electron microscope to be spherical and very uniform in size, averaging about 1 micron.

*Example XVIII*

This example illustrates agitation by ultrasonic sound waves. Using the same formulation as in Example I, a clear acid solution having a pH of about 2 was prepared as set forth in that example. This was cooled to room temperature, and a portion was poured into a tube and placed in an ultrasonic generator (Hypersonic Generator, Model Bw–204, Brush Development Co., Cleveland, Ohio). The generator was turned on, and the solution made slightly basic by the addition of dilute NaOH. Heat was evolved when the NaOH was added. The solution turned cloudy, and the mixture was left in the ultrasonic generator for several minutes to harden the beads. Thereafter, the beads were filtered, washed, and dried. They were also examined in the electron microscope and found to be spherical in shape and averaged about 1 micron in size as did the beads of the preceding example.

*Example XIX*

In this example the following ingredients were used:

| | Amount |
|---|---|
| Nonylphenyl ether of polyethylene glycol (Tergitol NPX, a surfactant) | 150 g. |
| Vinyltriethoxysilane (redistilled) | 600 ml. |
| Distilled water | 1125 ml. |
| 6 N H₂SO₄ | About 1½ ml. to a pH of about 2–3 |
| Triethylamine | About 1½ ml. to a pH of 7.5–8.5 |

The surfactant and water were mixed together in a reaction vessel, after which the ethoxysilane and sulfuric acid were added thereto. The mixture was heated with stirring until the solution cleared, which was at a temperature of about 50°–60° C. The reaction mass was cooled to room temperature (20°–30° C.), and the triethylamine was then added in an amount sufficient to make the liquid mass slightly basic. At this point the solution became cloudy. Heating and stirring were continued at about 60°–65° C. until the gel particles formed and hardened. Heating was continued to 80° C. in order to further harden the beads. The beads were isolated by filtration, washed with water, given a final acetone and water rinse and then filtered from the liquid and allowed to dry.

The dried beads were placed in a dilute aqueous NH₄OH solution (pH of 8–9) for about 16 hours, and then isolated by filtration, washed and dried. Thereafter the beads were heat-treated (ignited) to remove chemically bound vinyl groups and, also, any organic residue. Heat-treatment was carried out at about 600° C. while the beads were in a very thin layer (about ¼″ thick) on a tray or support placed in a furnace maintained at the above temperature and in which the beads were in an atmosphere of air.

The ignited beads were porous and substantially spherical. They had an average diameter of about 200 microns and an off-white color. They are useful as catalyst supports and in other applications.

Instead of using a heat-treating temperature of about 600° C. as in this example, one may use higher or lower temperatures within the aforementioned ranges depending, for example, upon the particular end use of the product and the particular properties desired therein.

Instead of heat-treating or igniting beads that have been prepared as described in this example, one can substitute beads that have been prepared as described in Examples I through XII, XIV, XV, XVII and XVIII. Such heat-treatments can be carried out within the broad temperature ranges hereinbefore set forth, more particularly within the range of from about 400° C. to about 1200° C., and preferably at from about 500°–1000° C.

The solid gel beads of the invention have a number of valuable uses. Such beads, of all sizes, but especially of the smaller sizes, are useful as refractory fillers in plastics, including polyethylene and alkyd resins. They will adsorb dyes and can be used to impart color to plastics. Further, the beads containing alkenyl groups are vulcanizable fillers for plastics, and for natural and synthetic rubbers. The finer beads are also useful as pigments in oil- and water-based paints. The beads are useful as desiccants and adsorbents. Fluorescent dyes can be adsorbed on the surfaces of the beads and can be embedded in clear plastic surface coatings to make fluorescent signs and decorative coatings.

As will be evident to those skilled in the art, various modifications of this invention can be made or followed in the light of the foregoing disclosure and discussion without departing from the spirit and scope of the disclosure or from the scope of the claims.

We claim:
1. A method of producing solid, substantially spherical, hard particles of organopolysiloxane which consists essentially of the following steps:
   (I) mixing with agitation
      (A) an organotrialkoxysilane of the formula

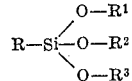

wherein R represents a radical selected from the group consisting of alkyl radicals having from 1 to 4 carbon atoms, inclusive, and alkenyl radicals having from 2 to 4 carbon atoms, inclusive, and R¹, R² and R³ each represent a methyl or ethyl radical,
      (B) an aqueous medium having a pH below 6 and comprising water in an amount in excess of 3 moles thereof per mole of the organotrialkoxysilane of (A), and
      (C) an emulsifying agent
      at an elevated temperature of above 30° C. until the mixture becomes clear;
   (II) cooling the mixture after it clears;
   (III) adding a base to provide a pH of the mixture of from over 7 to about 10 whereby the mixture becomes cloudy due to formation of droplets;
   (IV) heating and stirring the mixture to an elevated temperature of from 40° C. to 90° C.;
   (V) continuing stirring at said temperature until said droplets become solid, substantially spherical, hard particles of cross-linked organopolysiloxanes; and
   (VI) isolating the said particles from the aqueous medium in which they were formed.

2. The method as in claim 1 wherein the organotrialkoxysilane is methyltrimethoxysilane.
3. The method as in claim 1 wherein the organotrialkoxysilane is methyltriethoxysilane.
4. The method as in claim 1 wherein the organotrialkoxysilane is ethyltrimethoxysilane.
5. The method as in claim 1 wherein the organotrialkoxysilane is vinyltriethoxysilane.
6. The method as in claim 1 wherein the organotrialkoxysilane is ethyltriethoxysilane.
7. The method as in claim 1 wherein the organotrialkoxysilane is vinyltrimethoxysilane.
8. The method as in claim 1 wherein the aqueous medium of (B) is rendered acidic with sulfuric acid to a pH of about 2–3; the initial mixing temperature above 30° C. is about 50°–60° C.; the temperature to which the mixture is cooled in step II is room temperature; the base employed in step III is triethylamine in an amount sufficient to provide a pH of above 7 but below 9; and the elevated temperature to which the mixture is heated with stirring in steps IV and V is about 60°–80° C.
9. The method of claim 8 wherein the organotrialkoxysilane is vinyltriethoxysilane.
10. The method which comprises the step of heating solid, substantially spherical, hard particles of cross-linked organopolysiloxane, produced as defined in claim 1, after the isolated particles have been washed to remove impurities, at a temperature within the range of from about 400° C. to about 1500° C. and in an oxidizing atmosphere for a period sufficient to remove chemically bound organic groups from, but insufficient to cause substantial sintering together of, the individual particles.
11. The method as in claim 10 wherein the isolated and washed partcles are heated in an oixdizing atmosphere at a temperature within the range of from about 500° C. to about 1200° C.
12. The method which comprises:
   (a) hydrolyzing alkoxy groups of a compound represented by the general formula

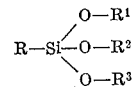

where R is a radical selected from the group consisting of alkyl radicals having from 1 to 4 carbon atoms, inclusive, and alkenyl radicals having from 2 to 4 carbon atoms, inclusive, and R¹, R², and R³ are each a lower alkyl radical, the hydrolysis being effected in an aqueous medium at a pH not higher than about 7 using in excess of 3 moles of water per mole of the said compound;
   (b) agitating said aqueous medium in the presence of an emulsifying agent dispersed in the aqueous medium until immiscible liquid droplets comprising initial condensation product separate from said aqueous medium;
   (c) adjusting the pH of the aqueous medium to a basic pH up to about 10;
   (d) continuing to agitate and mildly heat the basic aqueous medium while allowing the said droplets to harden by further condensation and to form substantially spherical gel particles;
   (e) isolating the said particles from the said aqueous medium;

(f) washing the isolated particles;
(g) soaking the washed particles in an aqueous solution of a water-soluble, nitrogen-containing base to remove metallic ions;
(h) washing the soaked particles from step (g); and
(i) heating the washed particles from step (h) at a temperature within the range of from about 400° C. to about 1500° C. and in an oxidizing atmosphere for a period sufficient to remove chemically-bound organic groups from, but insufficient to cause substantial sintering together of, the individual particles.

13. The method as in claim 12 wherein the aqueous solution of a water-soluble nitrogen-containing base is a dilute aqueous solution of ammonium hydroxide.

References Cited
UNITED STATES PATENTS

| | | | |
|---|---|---|---|
| 2,396,692 | 3/1946 | Garner | 260—46.5 X |
| 2,652,386 | 9/1953 | Wallman | 23—252 X |
| 2,801,185 | 7/1957 | Iler | 252—309 X |
| 2,832,794 | 4/1958 | Gordon | 260—46.5 X |

LEON D. ROSDOL, *Primary Examiner.*

R. D. LOVERING, *Assistant Examiner.*